United States Patent
Colpo et al.

(10) Patent No.: US 9,772,785 B2
(45) Date of Patent: *Sep. 26, 2017

(54) CONTROLLING PARTNER PARTITIONS IN A CLUSTERED STORAGE SYSTEM

(71) Applicant: INTERNATIONAL BUSINESS MACHINES CORPORATION, Armonk, NY (US)

(72) Inventors: Yolanda Colpo, Tucson, AZ (US); Larry Juarez, Tucson, AZ (US); Trung N. Nguyen, Tucson, AZ (US); Sean P. Riley, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,312

(22) Filed: Apr. 8, 2016

(65) Prior Publication Data
US 2016/0224263 A1    Aug. 4, 2016

Related U.S. Application Data

(63) Continuation of application No. 13/732,483, filed on Jan. 2, 2013, now Pat. No. 9,342,249.

(51) Int. Cl.
*G06F 3/06*  (2006.01)
*G06F 9/455*  (2006.01)

(52) U.S. Cl.
CPC ............ *G06F 3/0619* (2013.01); *G06F 3/067* (2013.01); *G06F 3/0614* (2013.01);
(Continued)

(58) Field of Classification Search
CPC ......... G06F 2009/45583; G06F 3/0614; G06F 3/0619; G06F 3/0625; G06F 3/0644;
(Continued)

(56) References Cited

U.S. PATENT DOCUMENTS

| 8,141,094 B2 | 3/2012 | Brown et al. |
| 9,342,249 B2 * | 5/2016 | Colpo ............... G06F 3/0614 |

(Continued)

OTHER PUBLICATIONS

McAuley et al., "IBM Versatile Storage Server," IBM Redbooks, First Edition, Aug. 1998 (200 pages).
(Continued)

*Primary Examiner* — Abdelmoniem Elamin
(74) *Attorney, Agent, or Firm* — Griffiths & Seaton PLLC

(57) ABSTRACT

A rack-power control module (RPC) module is used for allowing a local storage partition, located on a local server, for controlling a destination storage partition, located on a destination server, by piggybacking commands on power alerts issued by the RPC module in a clustered storage system. The commands are sent from the local storage partition to the RPC module, where the commands are RPC commands and include a destination server identification (ID) and payload data that includes a hypervisor command containing a command type, a subtype, and a destination ID. The RPC module then parses the commands received from the local storage partition.

14 Claims, 5 Drawing Sheets

(52) U.S. Cl.
CPC .......... *G06F 3/0625* (2013.01); *G06F 3/0644* (2013.01); *G06F 3/0659* (2013.01); *G06F 3/0665* (2013.01); *G06F 3/0689* (2013.01); *G06F 9/45558* (2013.01); *G06F 2009/45583* (2013.01); *Y02B 60/1246* (2013.01)

(58) Field of Classification Search
CPC ...... G06F 3/0659; G06F 3/0665; G06F 3/067; G06F 3/0689; G06F 9/45558; Y02B 60/1246
See application file for complete search history.

(56) References Cited

U.S. PATENT DOCUMENTS

| | | |
|---|---|---|
| 2007/0061441 A1 | 3/2007 | Landis et al. |
| 2007/0288592 A1 | 12/2007 | Kennedy et al. |
| 2013/0191337 A1 | 7/2013 | Goldberg |
| 2013/0191606 A1 | 7/2013 | Goldberg |
| 2014/0122816 A1 | 5/2014 | Barnes et al. |

OTHER PUBLICATIONS

Bailey et al., "IBM PowerVM Live Partition Mobility," IBM Redbooks, Mar. 2009 (308 pages).

* cited by examiner

CONTROLLING PARTNER PARTITIONS IN A CLUSTERED STORAGE SYSTEM

CROSS-REFERENCE TO RELATED APPLICATIONS

This Application is a Continuation of U.S. patent application Ser. No. 13/1732,483, filed on Jan. 2, 2013, now U.S. Pat. No. 9,342,249, the contents of which are incorporated herein by reference.

BACKGROUND OF THE INVENTION

Field of the Invention

The present invention relates in general to computers, and more particularly to controlling partner partitions in a clustered storage system in a computing environment.

Description of the Related Art

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to manage the flow of data. Moreover, the computer system may include a complex data processing system or computing environment. A computer system may include a complex data processing system or computing environment. The data system often requires computational resources or availability requirements that cannot be achieved by a single computer. Thus a need exists for controlling partner partitions in a clustered storage system, in a computing environment when a computer is architecturally arranged to form a cluster for sharing workload. More specifically, a need exists for a partition on a server to interact with a partner partition on another server where the partner partition is off, not responding, and/or not yet running the storage driver code.

SUMMARY OF THE DESCRIBED EMBODIMENTS

In one embodiment, a method is provided for controlling partner partitions in a clustered storage system, in a computing environment. A rack-power control module (RPC) module is used for allowing a local storage partition, located on a local server, for controlling a destination storage partition, located on a destination server, by piggybacking commands on power alerts issued by the RPC module in a clustered storage system. The commands are sent from the local storage partition to the RPC module, where the commands are RPC commands and include a destination server identification (ID) and payload data that includes a hypervisor command containing a command type, a subtype, and a destination ID. The RPC module then parses the commands received from the local storage partition.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
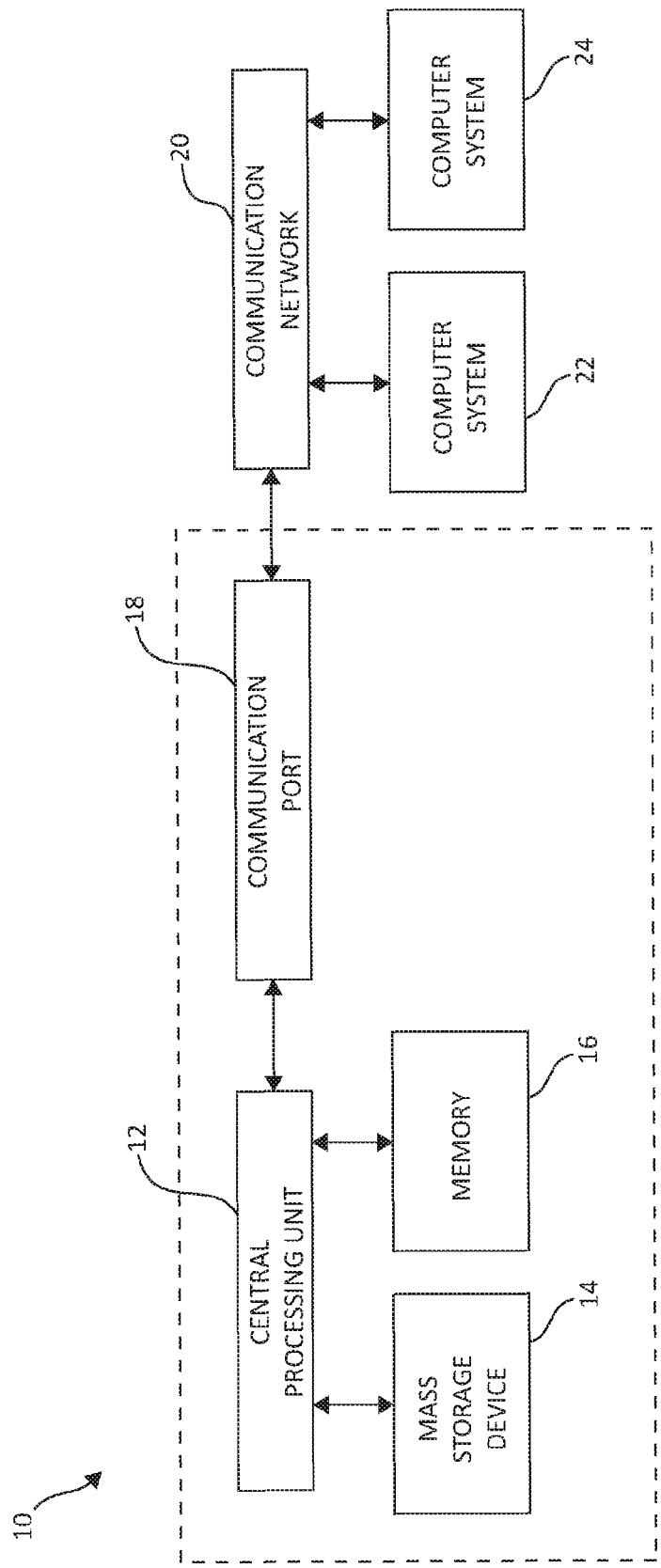
FIG. 1 is a block diagram illustrating a computing system environment having an example storage device in which aspects of the present invention may be realized.

As previously mentioned, a computer system may include a complex data processing system or computing environment. The data system often requires computational resources or availability requirements that cannot be achieved by a single computer. In such cases, a number of computers and storage systems may be architecturally arranged to form a cluster for networking several data processing systems together for the purpose of providing continuous resource availability and for sharing workload. Network services may be provided using a server cluster in which multiple server services are connected together in a storage area network (SAN) configuration. The cluster may be one node or, more commonly, a set of multiple nodes coordinating access to a set of shared storage subsystems typically through the storage area network (e.g., a set of shared storage subsystems). Within these enterprise storage systems (e.g., clustered storages system environments) there are typically multiple servers in a cluster to provide redundancy and/or performance.

As will be described herein, in one embodiment, for error recovery or code maintenance, a partition running on a server is required for being able to control a partner partition running on another server in the cluster storage environment, such as rebooting, powering off, or powering on the partner partition, which may be included in another cluster storage server. Hence, it is required that the servers to be connected together via some clustering hardware such as ethernet, Infiniband, etc., that can be managed by a hypervisor and provide interface for the partition to ask the hypervisor on one server to communicate with the hypervisor on another server to perform the partner control command. In one embodiment, dedicated hardware is required as well as a clustering interface that hypervisor needs to manage. In one embodiment, the present invention utilizes a rack power control facility that often exists in an Enterprise storage system to provide power alerts to the servers. One or more commands are piggybacked on this alert system to allow one partition in a server to control a partner partition running on another server. Piggybacking is similar to hitchhiking—two different and separate entities that share the same or similar destination and one of them uses the other as a transportation method towards the destination. Here, piggybacking is used to describe the process in which one command, emitted by one partition "rides" a power alert issued by the rack power control facility to reach a partner partition destination, for controlling the partner partition.

Accordingly, in one embodiment, by way of example only, a rack-power control module (RPC) module is used for allowing a local storage partition, located on a local server, for controlling a destination storage partition, located on a destination server, by piggybacking commands on power alerts issued by the RPC module in a clustered storage system. Hence, the RPC module is used as a way for a partition in a server to inform/control another partition (e.g., a partner partition) running on another server.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
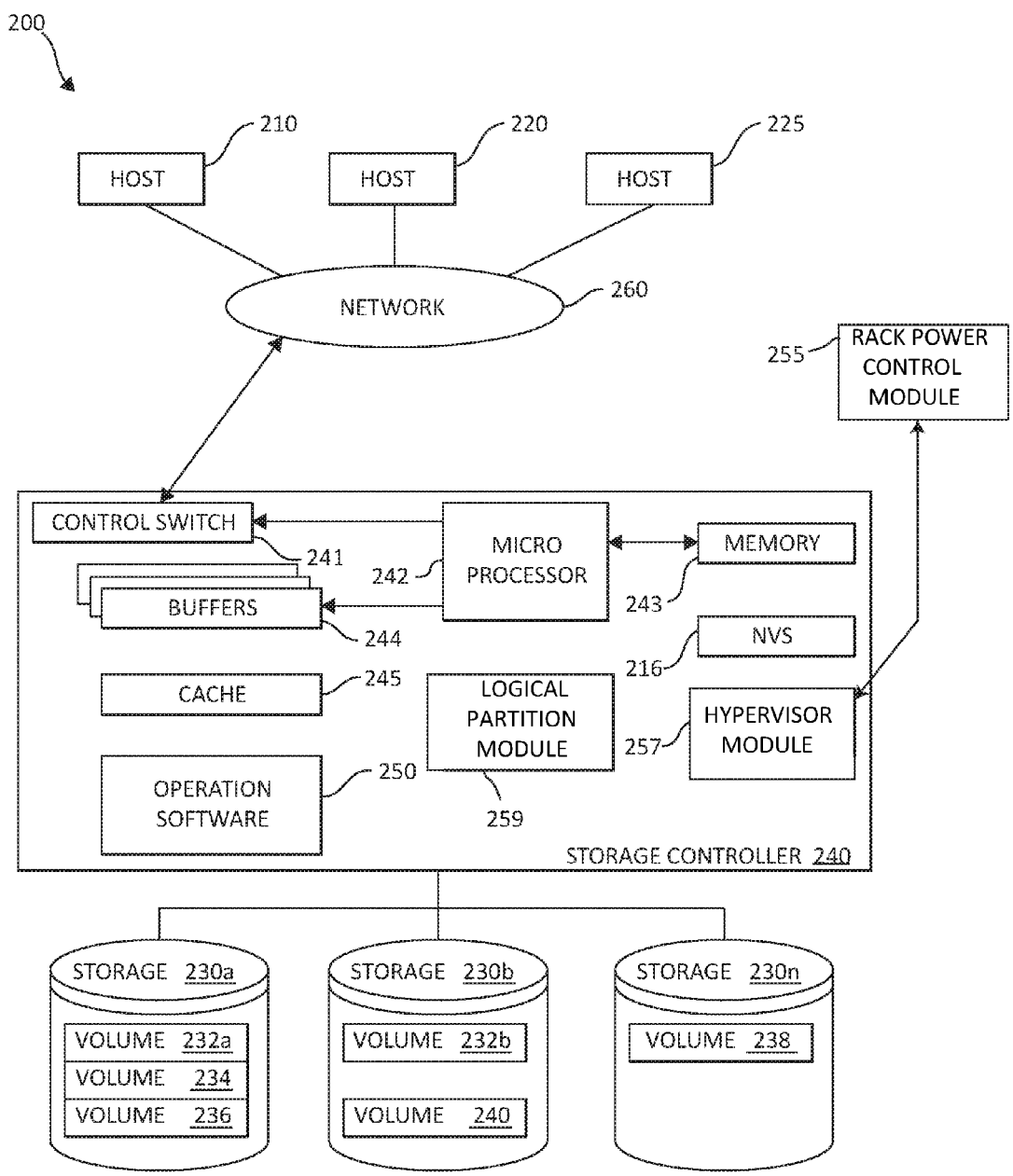
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230*a*, 230*b* and 230*n* are shown as ranks in data storage system 200, and are referred to herein as rank 230*a*, 230*b* and 230*n*. Ranks may be local to data storage system 200, or may be located at a physically remote location. In other words, a local storage controller may connect with a remote storage controller and manage storage at the remote location. Rank 230*a* is shown configured with two entire volumes, 234 and 236, as well as one partial volume 232*a*. Rank 230*b* is shown with another partial volume 232*b*. Thus volume 232 is allocated across ranks 230*a* and 230*b*. Rank 230*n* is shown as being fully allocated to volume 238—that is, rank 230*n* refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a rack power control module 255, a hypervisor, and a LPAR 259. The rack power control module 255, the hypervisor 257, and the LPAR 259 may work in conjunction with each and every component of the storage controller 240, the hosts 210, 220, 225, and storage devices 230. The hypervisor 257 supports multiple instances of one or more operating systems and/or operating system partitions on the shared computational resources of the distributed data processing clusters/nodes of system 200 (e.g., hosts, 210, 220, and 225). The hypervisor 257 communicates with system-level service processor of the system 200, which is responsible for booting a system and for monitoring the availability of the shared resources 210, 220, and 225. A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image. Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform. To create and maintain separation between the partitions within each system 200 of a clustered storage system is the use of a firmware component referred to as a hypervisor 257.

Also, in one embodiment, the hypervisor 257 may be installed on each server and implemented as firmware. The hypervisor 257 may perform a number of functions and services for operating system images (not shown) to create and enforce the partitioning of logically partitioned platform 259. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). The hypervisor 257 may manage the allocation of computer resources. For example, the hypervisor 257 may allocate a first block of memory to a first virtual computer and a second block of memory to a second virtual computer. In addition, the hypervisor may allow two or more operating systems (OS) to execute on virtual computers. A context of each OS may run on separate virtual computers. The hypervisor 257 may manage the switching of contexts between each OS. The partitioning of the computer hardware into multiple virtual computers can significantly reduce the cost of providing multiple computers. Also server virtualization may user the hypervisor 257 and the OS may be executed on a LPAR in the virtual machine. LPAR is the abbreviation of a logical partition 259, and is a logical hardware resource that is based on a physical hardware resource.

Each distributed data processing node/hosts, 210, 220, and 225 is associated with a service processor/microprocessor 242, e.g., service processors, each of which is responsible for booting its associated node and for assisting system-level service processor in monitoring each of the nodes; a service processor/microprocessor 242 may be associated with a node through a variety of physical connections to its associated node, e.g., the service processor's hardware card may attach to a PCI bus. It should be noted that each node may have a plurality of service processors/microprocessors 242, although only one service processor would be responsible for booting its associated node. The rack power control module 255, the hypervisor 257, the LPAR 259 may be structurally one complete module or may be associated and/or included with other individual modules. The rack power control module 255, the hypervisor 257, and the LPAR 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the rack power control module 255, the hypervisor 257, and the LPAR 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, rack power control module 255, the hypervisor 257, and the LPAR 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the rack power control module 255, the hypervisor 257, and the LPAR 259 may also be located in the cache 245 or other components. As such, one or more of the rack power control modules 255, the hypervisor 257, and/or the LPAR 259 may be used as needed, based upon the storage architecture and users' preferences.

Figure 3:
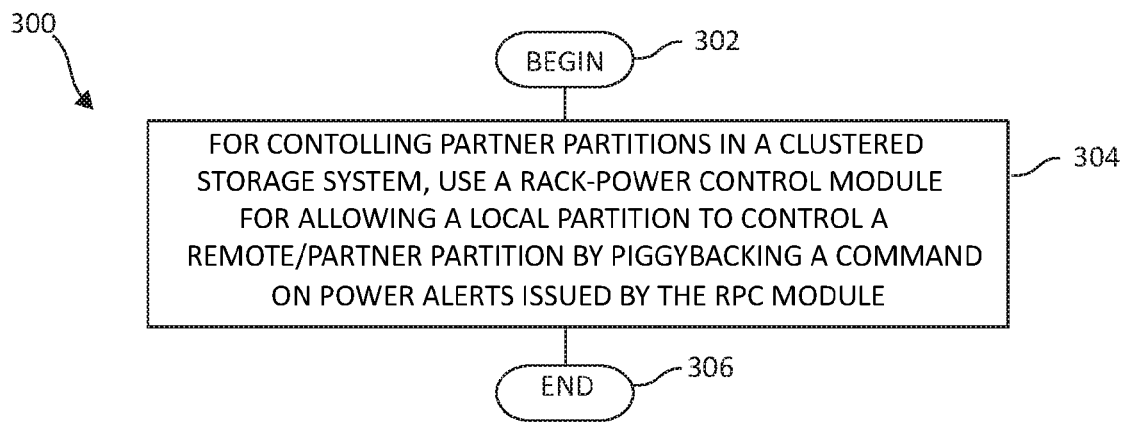
FIG. 3 is a flowchart illustrating an exemplary method for controlling partner partitions in a clustered storage system.

FIG. 3 is a flowchart illustrating an exemplary method for controlling partner partitions in a clustered storage system. For controlling partner partitions in a clustered storage system, the method 300 begins (step 302) by using a rack-power control module (RPC) module for allowing a local storage partition, located on a local server, for controlling a destination storage partition, located on a destination server, by piggybacking a plurality of commands on power alerts issued by the RPC module (step 304). The method 300 ends (step 306).

Figure 4:
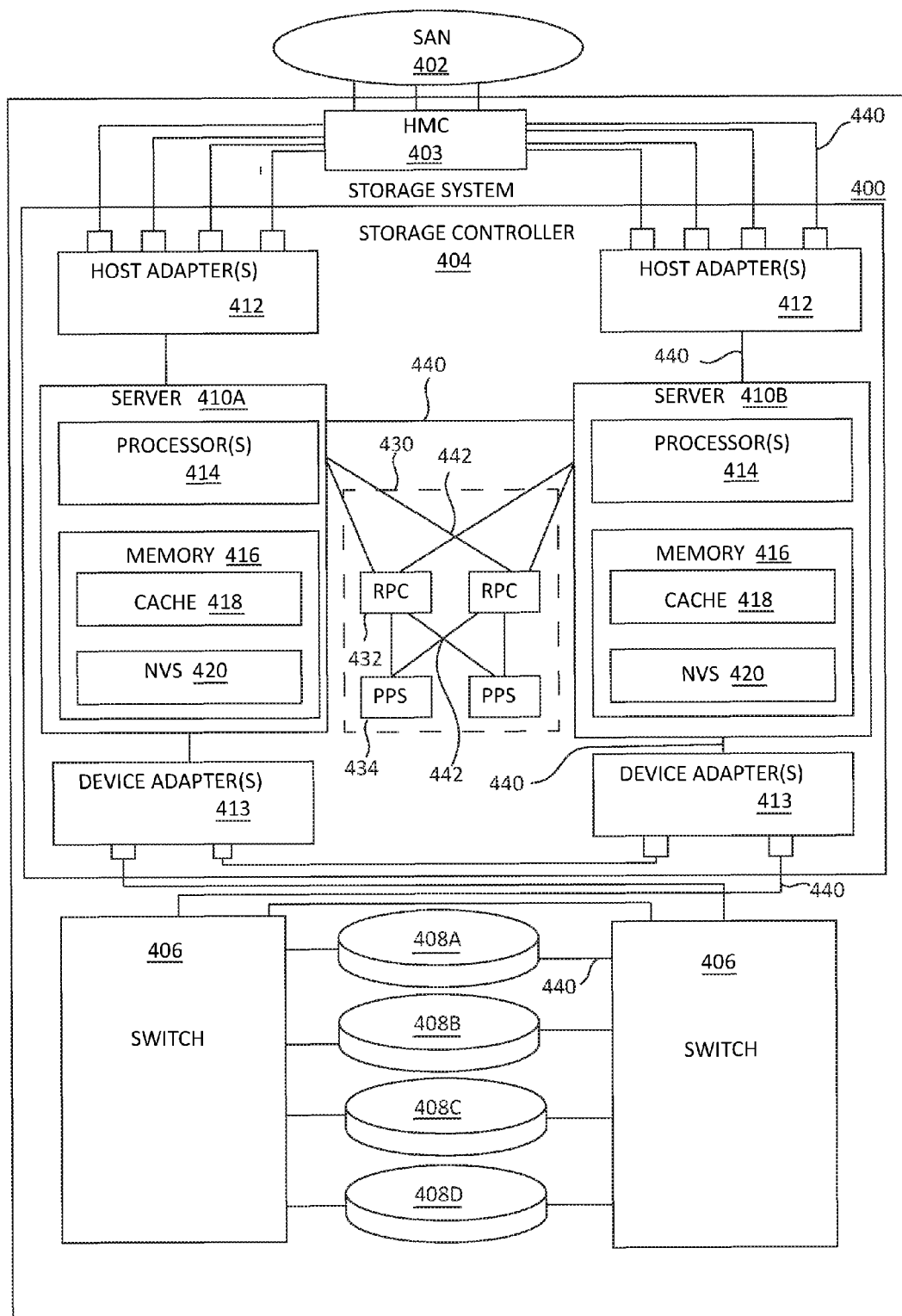
FIG. 4 is a block diagram illustrating an exemplary alternative block diagram of a storage system connected to a SAN in which aspects of the present invention may be realized.

Turning now to FIG. 4, FIG. 4 is a block diagram illustrating an exemplary alternative block diagram of a storage system connected to a SAN in which aspects of the present invention may be realized. The storage system 400 contains an array of hard-disk drives (HDDs) and/or solid-state drives (SDDs) such as a RAID array. As shown, the storage system 400 includes a hardware management controller (HMC) 403, a storage controller 404, one or more switches 406, and one or more storage devices 408, such as hard disk drives 408 or solid-state drives 408. The storage controller 404 may enable one or more hosts (e.g., open system and/or mainframe servers) to access data in one or more storage devices 406. In selected embodiments, the storage controller 404 includes one or more local servers 410. The storage controller 404 may also include host adapters 412 and device adapters 413 to connect to host devices and storage devices 408, respectively. Multiple local servers 410A, 410B may provide redundancy to ensure that data is always available to connected hosts.

Thus, if one server 410A fails, the other servers 410B may remain functional to ensure that I/O is able to continue between the hosts and the storage devices 408. This process may be referred to as a "failover." Then, for example, using the rack-power control module (RPC) module, the local storage partition, located on a local server, controls a destination storage partition, located on a destination server. The commands, issued by the local storage partition, piggybacks the commands on power alerts issued by the RPC module. One example of a storage controller 404 having architecture similar to that illustrated in FIG. 4 is the IBM DS8000™ enterprise storage system. The DS8000™ is a high-performance, high-capacity storage controller providing disk storage that is designed to support continuous operations. The DS8000™ series models may use IBM's POWER5™ servers 410A, 410B, which may be integrated with IBM's virtualization engine technology. Nevertheless, the software update apparatus and methods disclosed herein are not limited to the IBM DS8000™ enterprise storage system 400, but may be implemented in comparable or analogous storage systems, regardless of the manufacturer, product name, or components or component names associated with the system. Furthermore, any system that could benefit from one or more embodiments of the invention is deemed to fall within the scope of the invention. Thus, the IBM DS8000™ is presented only by way of example and is not intended to be limiting.

In selected embodiments, each server 410 may include one or more processors 414 (e.g., n-way symmetric multiprocessors) and memory 416. The memory 416 may include volatile memory (e.g., RAM) as well as non-volatile memory (e.g., ROM, EPROM, EEPROM, hard disks, flash memory, etc.). The volatile memory and non-volatile memory may, in certain embodiments, store software modules that run on the processor(s) 414 and are used to access data in the storage devices 408. The server 410 may host at least one instance of these software modules. These software modules may manage all read and write requests to logical volumes in the storage devices 408. The memory 416 includes a volatile cache 418 and non-volatile storage 420. Whenever a host (e.g., an open system or mainframe server) performs a read operation, the server 410 may fetch data from the storages devices 408 and save data in the cache 418 in the event the data is required again. If the data is requested again by a host, the server 410 may fetch the data from the cache 418 instead of fetching it from the storage devices 408, saving both time and resources. Storage system 400 also includes a power subsystem 430 that provides power to the various components of the system. Power subsystem 430 comprises multiple redundant rack power controllers (RPC) 432 and multiple redundant primary power supplies (PPS) 434. The RPC is a communications controller for the power subsystem of the DS8000 enterprise storage system. The RPC formats and routes data between the various entities of the power subsystem and the local servers. The Primary Power Supply (PPS) is a modular power supply, providing power (e.g, 11.5 kW) for use by all the various components of the DS8000 enterprise storage system, including the local server, drives, RPCs, batteries, etc.

To facilitate the rapid transfer of large amounts of data, the HMC 403, storage controller 404 (and all of its components), switches 406 and storage devices 408 are all interconnected via high-throughput channels 440 such as Ethernet or Fibre Channel. The RPC modules and PPSs are interconnected to each other and local server 410A, 410B via low-throughput I2C buses 442. When the software for the HMC, storage controller (and all of its components), switch or storage devices must be updated, the software update image is simply pushed from the remote server through the high-throughput channels to the final destination or "end host" where the image is loaded and executed. The network connection of the SAN and the Ethernet or Fibre Channel connections are at least 100 MB/sec and thus the software update can occur very quickly with no disruption to normal message traffic or data transfer. When the software for the RPC or PPS must be updated, the software update image is pushed from the remote server through the high-throughput channels to local server 410a and 410b where it is stored in memory 416. The current software image running on the "end hosts" (RPCs or PPPs) serviced by the local server is also stored in memory 416. The local processors 414 are configured to using a rack-power control module (RPC) module for allowing a local storage partition, located on a local server, for controlling a destination storage partition, located on a destination server, by piggybacking a plurality of commands on power alerts issued by the RPC module, as previously described.

Figure 5:
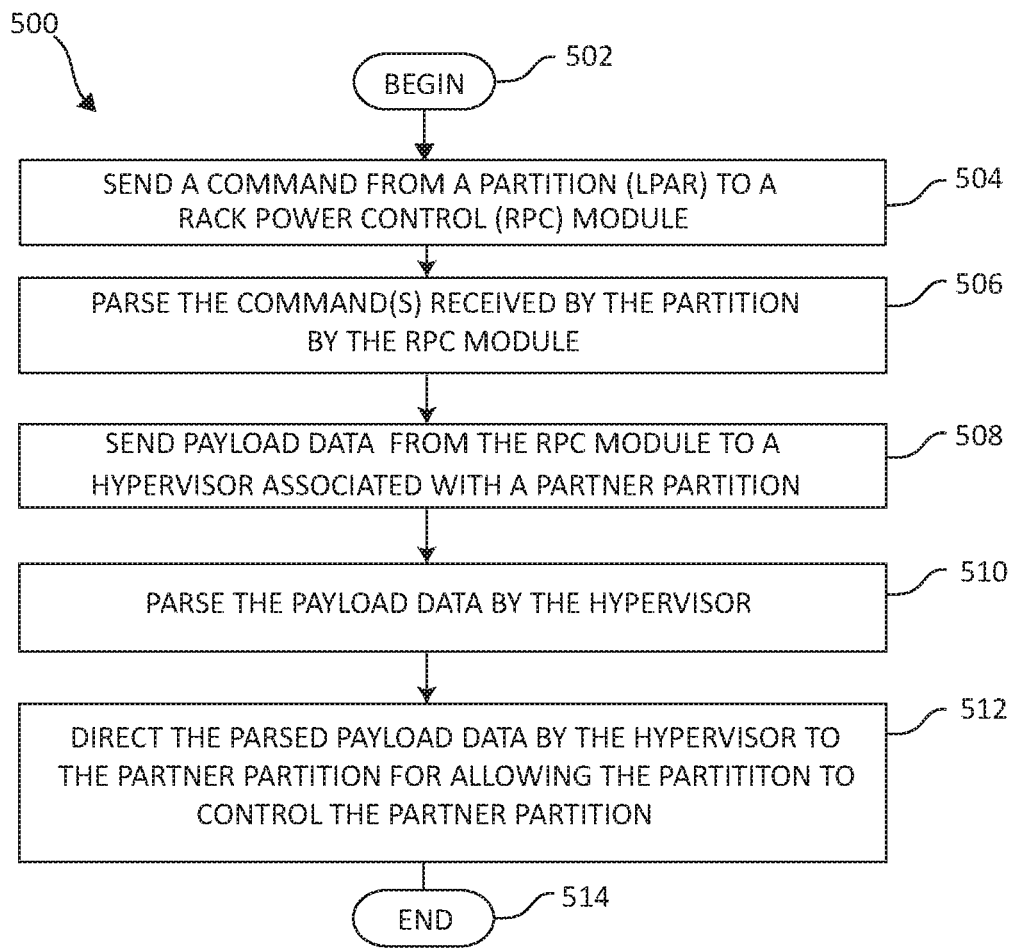
FIG. 5 is a flowchart illustrating an alternative exemplary method for controlling partner partitions in a clustered storage system.

In one embodiment, the various hardware and embodiments, previously described, are used for controlling a partner partition by using a rack-power control module (RPC). The RPC is used for allowing a local storage partition, located on a local server, to control a destination storage partition, located on a destination server, by piggybacking a plurality of commands on power alerts issued by the RPC module. Turning now to FIG. 5, FIG. 5 is a flowchart illustrating an alternative exemplary method for controlling partner partitions in a clustered storage system. The method 500 begins (step 502) by sending at least one type of command from a local storage partition to the RPC module (step 504). The commands are RPC commands. The RPC commands, sent by the partition to the RPC, include a destination server identification (ID) and payload data. The payload data includes a hypervisor command. The payload data can be variable in size, and have different classes of commands. One class could be for controlling the partner partitions, which may include commands such as power off, power on, reboot, forcing a crash dump. Another class could be for querying information about the partner partitions such as getting the partition OS code level, memory size, processing capability, etc. The hypervisor commands contain a command type, a subtype, and a destination identification (ID). Upon receiving the command from the partition, the RPC module parses the command(s) received from the local storage partition (step 506). The RPC module is in communication with each hypervisor and storage drivers associated with each of the servers. The payload data, which is parsed by the RPC module from the command(s), is sent to the hypervisor associated with the destination server (e.g., partner partition) (step 508). The method 500 parses the payload data by the hypervisor (step 510). The hypervisor directs the parsed payload data to the destination server thereby allowing the local partition to control the destination storage partition (step 512). The commands include at least one a powering off command, a power on command, and a reboot command. The method 500 ends (step 514).

In an alternative embodiment, a running logical partition (LPAR) sends the RPC a command (e.g., the RPC commands) via the RPC. The LPAR uses storage driver code to communicate with the RPC. The RPC parses the command and sends the payload data (e.g., the hypervisor commands that contains the command type, the subtype, and the destination ID) to a server's hypervisor via the RPC communicating with the hypervisor of a storage server in the system. The hypervisor parses the hypervisor commands, and directs the requested action (e.g., such as powering off, powering on, rebooting, etc.), to the target partition.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for controlling partner partitions in a clustered storage system by a processor device in a computing environment, the method comprising:
    using a physical rack-power control module (RPC) module for allowing a local storage partition, located on a local server, for controlling a destination storage partition, located on a destination server, by piggybacking a plurality of commands on power alerts issued by the RPC module;
    sending at least one of the plurality of commands from the local storage partition to the RPC module, wherein the plurality of commands are RPC commands and include a destination server identification (ID) and payload data that includes a hypervisor command containing a command type, a subtype, and a destination ID; and
    parsing by the RPC module the at least one of the plurality of commands received from the local storage partition.

2. The method of claim 1, further including connecting the RPC module to a plurality of servers in the clustered storage system.

3. The method of claim 2, further including communicating by RPC module with each hypervisor and storage drivers associated with each of the plurality of servers.

4. The method of claim 3, further including sending payload data from the at least one of the plurality of commands that is parsed by the RPC module to the hypervisor associated with the destination server.

5. The method of claim 4, further including:
    parsing the at least one of the plurality of commands by the hypervisor, wherein the at least one of the plurality of commands include the payload data sent to the hypervisor,
    directing the parsed payload data to the destination server thereby allowing the local partition to control the destination storage partition, wherein the plurality of commands include at least one a powering off command, a power on command, and a reboot command.

6. A system for controlling partner partitions in a clustered storage system in a computing environment, the system comprising:
    a processor device operable in the computing storage environment, wherein the processor device:
        uses a physical rack-power control module (RPC) module for allowing a local storage partition, located on a local server, for controlling a destination storage partition, located on a destination server, by piggybacking a plurality of commands on power alerts issued by the RPC module,
        sends at least one of the plurality of commands from the local storage partition to the RPC module, wherein the plurality of commands are RPC commands and include a destination server identification (ID) and payload data that includes a hypervisor command containing a command type, a subtype, and a destination ID, and
        parses by the RPC module the at least one of the plurality of commands received from the local storage partition.

7. The system of claim 6, wherein the processor device connects the RPC module to a plurality of servers in the clustered storage system.

8. The system of claim 7, wherein the processor device communicates by RPC module with each hypervisor and storage drivers associated with each of the plurality of servers.

9. The system of claim 8, wherein the processor device sends payload data from the at least one of the plurality of commands that is parsed by the RPC module to the hypervisor associated with the destination server.

10. The system of claim 9, wherein the processor device:
    parses the at least one of the plurality of commands by the hypervisor, wherein the at least one of the plurality of commands include the payload data sent to the hypervisor, and
    directs the parsed payload data to the destination server thereby allowing the local partition to control the destination storage partition, wherein the plurality of commands include at least one a powering off command, a power on command, and a reboot command.

11. A computer program product for controlling partner partitions in a clustered storage system by a processor device, the computer program product comprising a non-transitory computer-readable storage medium having computer-readable program code portions stored therein, the computer-readable program code portions comprising:
    a first executable portion that uses a rack-power control module (RPC) module for allowing a local storage partition, located on a local server, for controlling a destination storage partition, located on a destination server, by piggybacking a plurality of commands on power alerts issued by the RPC module;
    a second executable portion that sends at least one of the plurality of commands from the local storage partition to the RPC module, wherein the plurality of commands are RPC commands and include a destination server identification (ID) and payload data that includes a hypervisor command containing a command type, a subtype, and a destination ID; and a third executable portion that parses by the RPC module the at least one of the plurality of commands received from the local storage partition.

12. The computer program product of claim 11, further including a fourth executable portion that connects the RPC module to a plurality of servers in the clustered storage system.

13. The computer program product of claim 12, further including a fifth executable portion that:
communicates by RPC module with each hypervisor and storage drivers associated with each of the plurality of servers, and
sends payload data from the at least one of the plurality of commands that is parsed by the RPC module to the hypervisor associated with the destination server.

14. The computer program product of claim 13, further including a sixth executable portion that:
parses the at least one of the plurality of commands by the hypervisor, wherein the at least one of the plurality of commands include the payload data sent to the hypervisor, and
directs the parsed payload data to the destination server thereby allowing the local partition to control the destination storage partition, wherein the plurality of commands include at least one a powering off command, a power on command, and a reboot command.

* * * * *